UNITED STATES PATENT OFFICE.

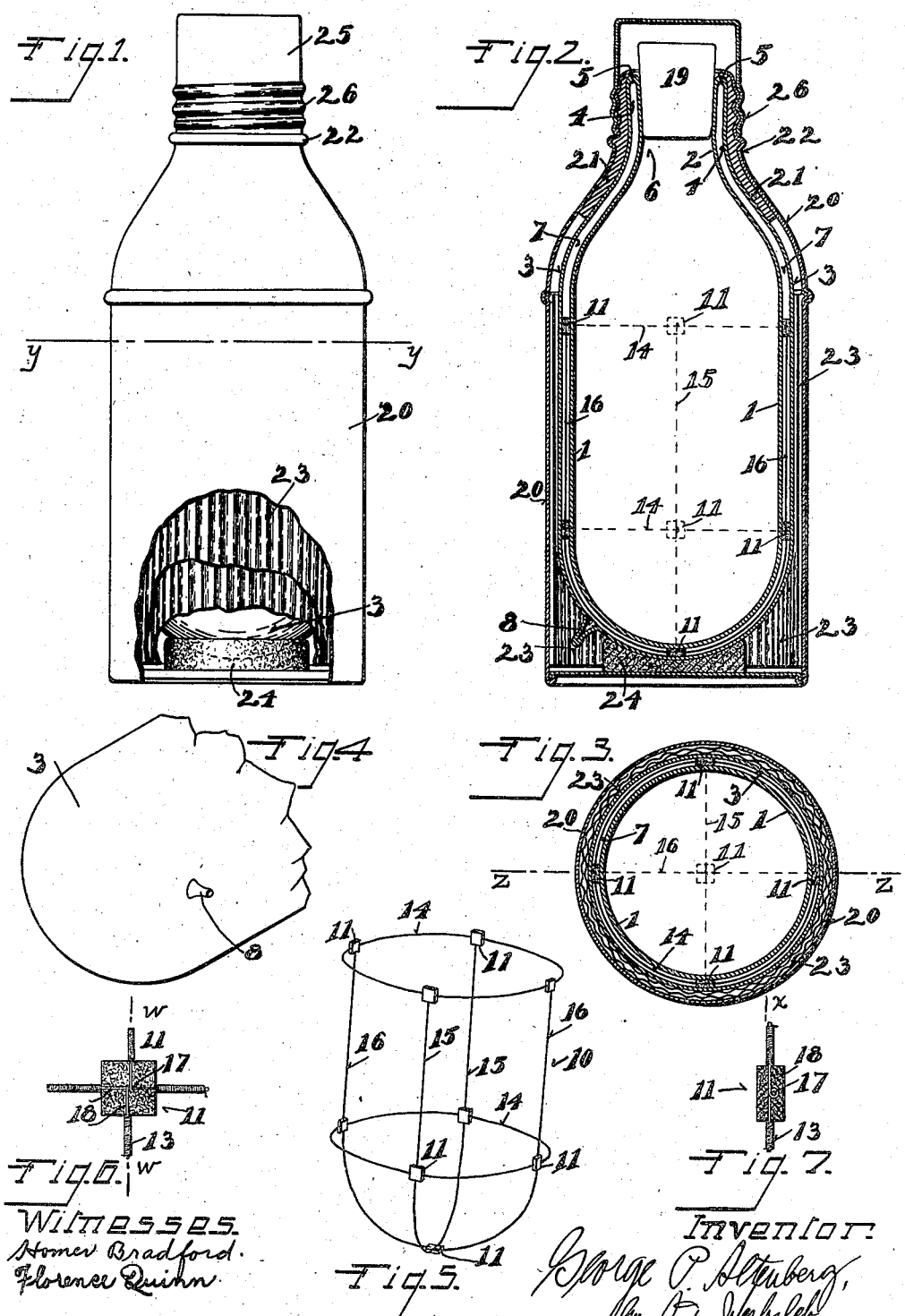

GEORGE P. ALTENBERG, OF CINCINNATI, OHIO.

DOUBLE-WALLED VESSEL.

No. 900,075.   Specification of Letters Patent.   Patented Oct. 6, 1908.

Application filed December 23, 1907. Serial No. 407,762.

*To all whom it may concern:*

Be it known that I, GEORGE P. ALTENBERG, a citizen of the United States, residing at Cincinnati, in the county of Hamilton and State of Ohio, have invented certain new and useful Improvements in Double-Walled Vessels, of which the following is a specification.

My invention relates to double walled vessels adapted to preserve the contents at substantially the temperature at which they have been placed in the vessel, for a considerable period of time, and the invention will be readily understood from the following description and claims, and from the drawing, in which latter:

Figure 1 is a front elevation of my improved device, partly broken away. Fig. 2 is a central vertical longitudinal section of the same, taken on a line corresponding to the line $z$—$z$ of Fig. 3. Fig. 3 is a horizontal cross-section of the same taken on the line $y$—$y$ of Fig. 1. Fig. 4 is a bottom perspective view of the vessel, partly broken away, with the outer casing removed. Fig. 5 is a perspective view of the basket holding the supporting pieces in place. Fig. 6 is a detail showing the connection between one of the supporting pieces and the wire of the basket, in section on a line corresponding to the line $x$ of Fig. 7; and Fig. 7 is a similar detail on a line corresponding to the line $w$—$w$ of Fig. 6.

1 represents an inner member of the vessel constricted at its top for forming a neck 2, and 3 is an outer member of said vessel also constricted at its top for forming a neck 4, these necks being joined preferably approximately at their ends as shown at 5 for forming the combined neck 6 of the vessel. The joining preferably takes place by fusing the necks 2, 4 or otherwise hermetically sealing the same. The vessel is preferably formed of glass or other substance which is impervious to air. A space 7 is formed between the members of the vessel, this space surrounding the inner member. The air in this space is withdrawn or practically exhausted for forming a vacuum which in practice acts as a heat-insulating blanket for the inner member. For accomplishing the withdrawal of the air, I provide the outer member with a nipple 8 through which the air in the cavity is withdrawn, the nipple being sealed, as by fusing, after withdrawal of the air and thereby sealing the vacuum which has been created in the cavity.

10 is a basket upon which supporting pieces 11 are held. The framing of the basket is preferably composed of wires, which I prefer to cover with a heat-insulating material 13, such as asbestos, shown in the form of cord wound about the wires. These supporting pieces are also of heat-insulating material, and I have found that asbestos forms a preferable material out of which these pieces are made. A heat-insulating separating or supporting medium is thus formed between the inner and outer members which permits expansion and contraction especially of the inner member without undue strain upon different parts of the same. The structure comprising the basket and supporting pieces thereon is supported from the outer vessel. My improved structure prevents unequal resistance upon different parts of the inner member, and acts as a support for the inner member without itself in turn depending for its support upon said inner member. In this manner fracture of the inner member at the neck or at other parts is avoided, the inner member being supported laterally and longitudinally for permitting its expansion and contraction relatively to the outer member, there being sufficient resiliency in the supporting pieces to permit this. I prefer that the basket shall comprise lateral wires 14 and longitudinal wires 15, 16, which latter are bowed about the lower end of the inner member. At the junction between the lateral and longitudinal wires, one of them is twisted about the other as shown at 17, and at this junction the wires are bared of their insulating covering as shown at 18 for reducing the size of the joint, the pieces being secured to the wires at the joints. The wires may cross at the bottom of the inner member without being twisted.

The vessel is adapted to be closed by a suitable stopper 19. A protecting casing 20 surrounds the vessel and is held with relation thereto at its top by a collar 21, which may be of plaster of paris for holding the neck of the vessel and the neck 22 of the casing in rigid relation. A packing 23 surrounds the vessel inside the casing and extends longitudinally of the same. I prefer this packing to be of corrugated strawboard. The bottom of the vessel is preferably supported on a felt pad 24. A releasable cup 25 takes about the neck 22 and is releasably secured thereto in suitable manner as by having screw-connection 26 therewith.

Having thus fully described my invention what I claim as new and desire to secure by Letters Patent is:

1. In combination, a double walled vessel comprising an inner member and an outer member having a heat-insulating space therebetween, a basket composed of wire located in said space and surrounding the lower part of said inner member, supporting pieces located between the side walls of said inner and outer members and a supporting piece between the bottom walls of said members, said supporting pieces being held in place by said basket.

2. In combination, a double walled vessel comprising an inner member and an outer member having a heat-insulating space therebetween, a basket composed of heat insulated wire located in said space and surrounding the lower part of said inner member, supporting pieces located between the side walls of said inner and outer members and a supporting piece between the bottom walls of said members, said supporting pieces being held in place by said basket.

In testimony whereof, I have subscribed my name hereto in the presence of two subscribing witnesses.

GEORGE P. ALTENBERG.

Witnesses:
 EARLE R. PASSEL,
 FLORENCE QUINN.